E. WRIGHT.
ICE CUTTING MACHINE.
APPLICATION FILED JAN. 22, 1912.
1,094,396.
Patented Apr. 21, 1914.
3 SHEETS—SHEET 3.
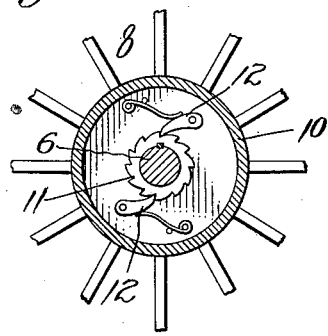
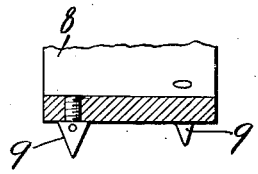
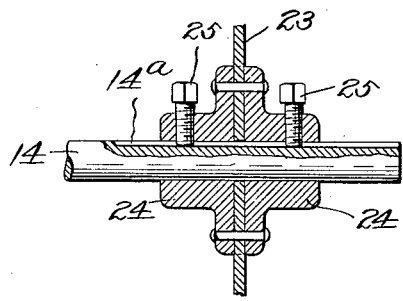
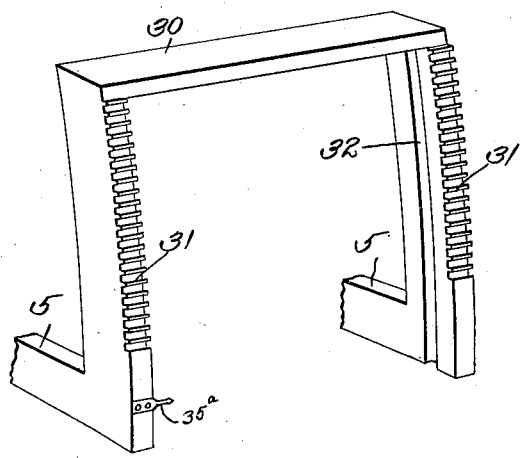
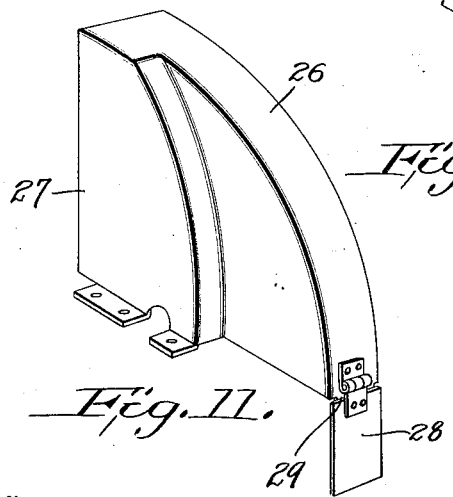
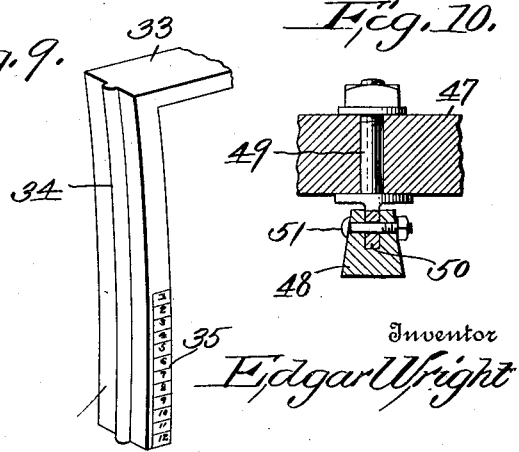

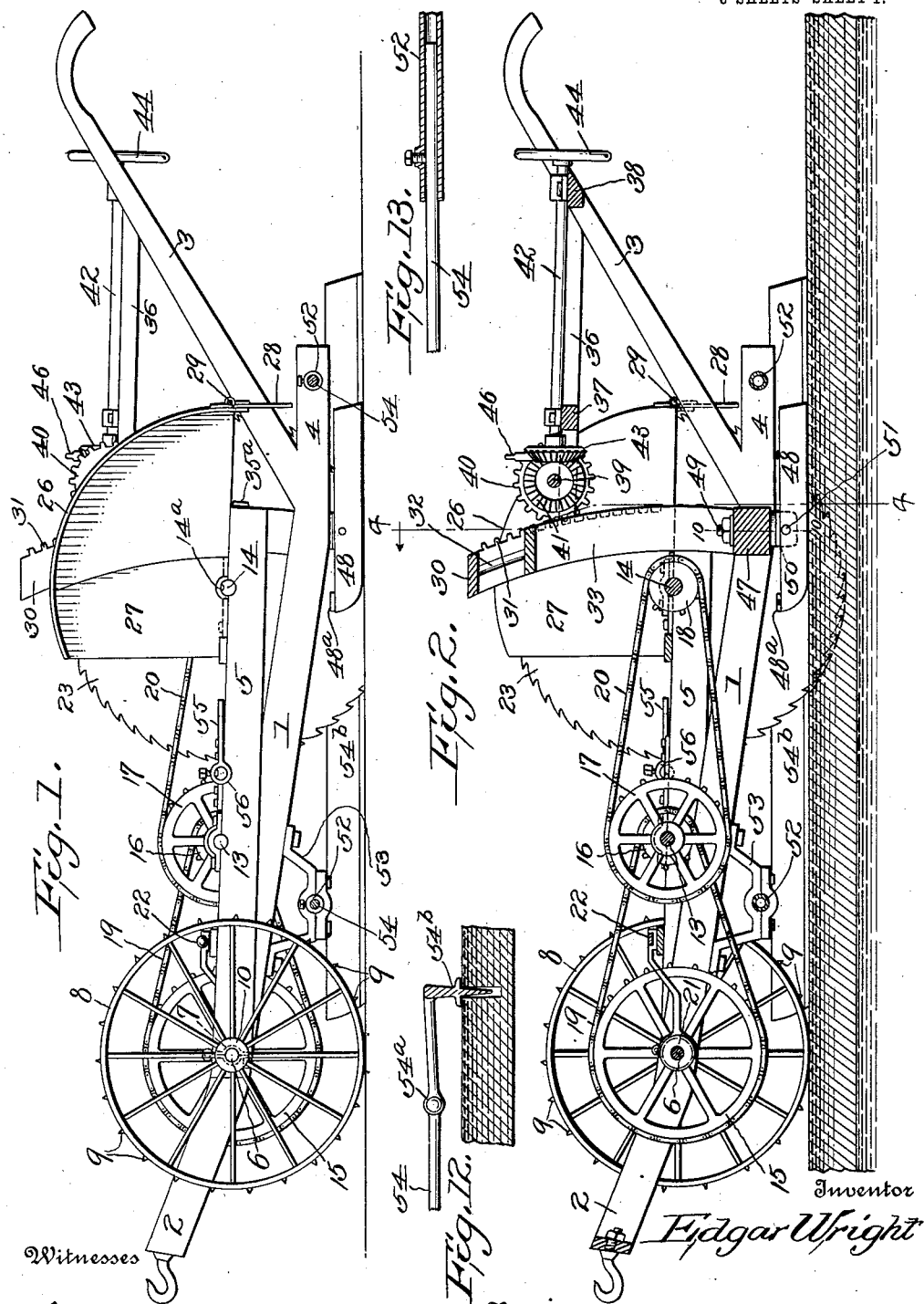

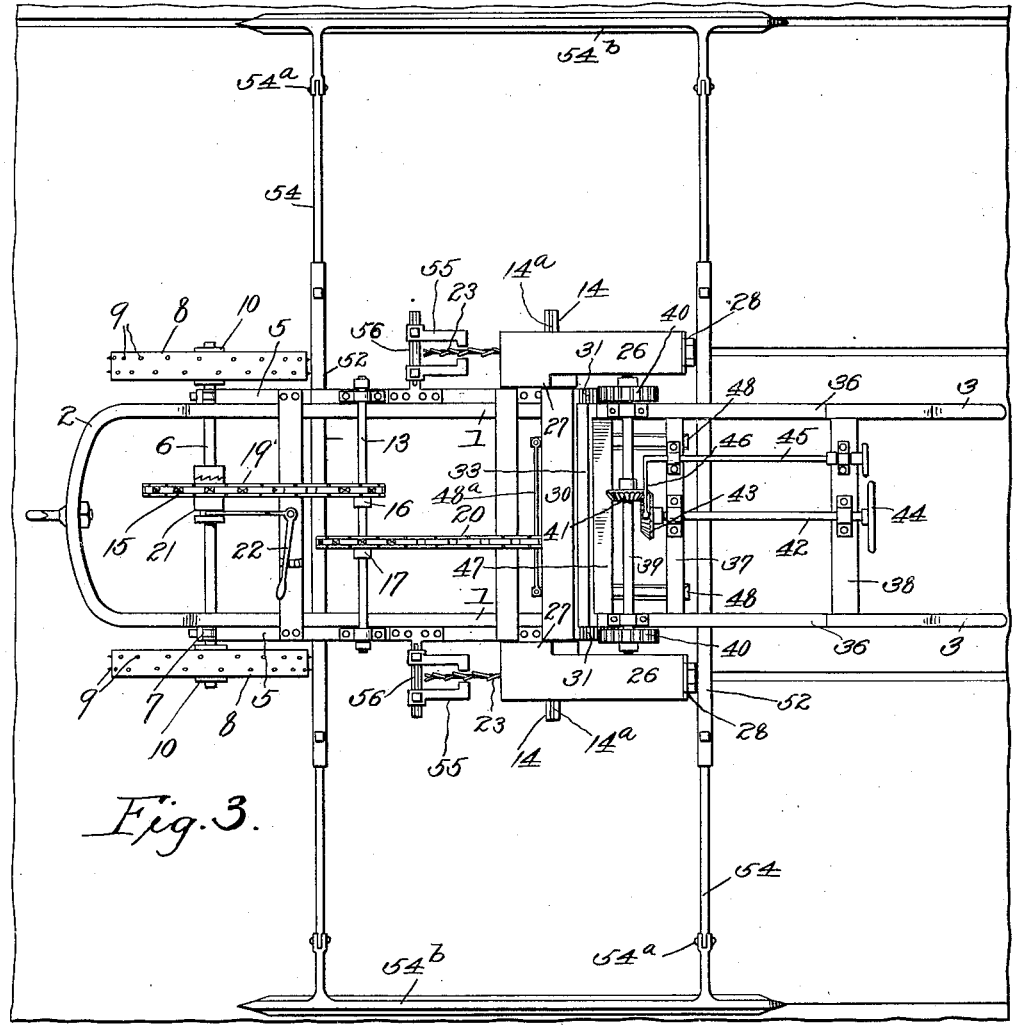
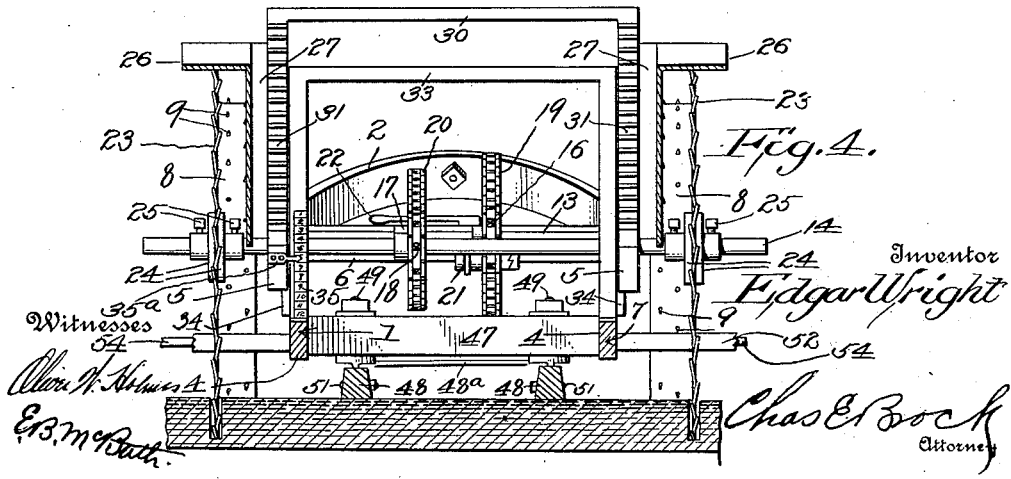

UNITED STATES PATENT OFFICE.

EDGAR WRIGHT, OF WARREN, MASSACHUSETTS.

ICE-CUTTING MACHINE.

1,094,396. Specification of Letters Patent. Patented Apr. 21, 1914.

Application filed January 22, 1912. Serial No. 672,590.

*To all whom it may concern:*

Be it known that I, EDGAR WRIGHT, a citizen of the United States, residing at Warren, in the county of Worcester and State of Massachusetts, have invented a new and useful Improvement in Ice-Cutting Machines, of which the following is a specification.

This invention relates to an ice cutting machine, the object of the invention is to provide a device of this kind which will make two cuts at the same time, and in which the depth of the cut can be readily ascertained and regulated.

With these objects in view the invention consists of the novel features of construction hereinafter described, pointed out in the claim shown in the accompanying drawings, in which—

Figure 1 is a side elevation, parts being in section. Fig. 2 is a longitudinal vertical section. Fig. 3 is a plan view. Fig. 4 is a section on the line 4—4 of Fig. 2. Fig. 5 is a detail sectional view of a hub of a drive wheel. Fig. 6 is a detail transverse section through the rim of a drive wheel. Fig. 7 is a detail sectional view illustrating the manner of securing a saw to a shaft. Fig. 8 is a perspective view of a rack frame. Fig. 9 is a perspective view of a portion of a graduated frame. Fig. 10 is a detail sectional view on the line 10—10 of Fig. 2. Fig. 11 is a perspective view of a saw hood and flap. Fig. 12 is a side elevation partly in section showing the manner of connecting a guide runner. Fig. 13 is a detail sectional view illustrating means for adjustably connecting the guide runners.

In constructing the device I employ a main frame 1 the forward end of which is angled upwardly as shown at 2 and provided with a suitable draft hook. Said frame at its rear end has upwardly and rearwardly extending handles 3, and this frame is also provided with a rear extension 4. A second or saw frame 5 is journaled upon a suitable shaft 6 by hinged bearings 7, thereby permitting disengagement of the two frames, the shaft 6 being suitably journaled in the frame 1. Upon this shaft are suitable ground or drive wheels 8, and upon the wheel rims are inserted spurs 9, said spurs being preferably screwed into the wheel rim and arranged in two staggered rows. These wheels are provided with hollow hubs 10, and on the shaft 6 are ratchets 11, and within the hubs are arranged spring pressed pawls 12 which engage the ratchets. This prevents reverse rotation of the shaft 6 when turning or backing the machine.

Journaled on the frame 5 are shafts 13 and 14, and upon the shaft 6 is loosely mounted a sprocket wheel 15, sprocket wheels 16 and 17 are fixed upon the shaft 13, and a small sprocket wheel 18 is fixed upon the shaft 14. A sprocket chain 19 runs over the sprocket wheels 15 and 16 and a sprocket chain 20 runs over the sprocket wheels 17 and 18. A suitable clutch 21 mounted upon the shaft 6 and operated by a bell crank lever 22 serves to lock the sprocket wheel 15 to the shaft 6, and by means of the gearing above described the rotation of the shaft 6 is imparted to the saw shaft 14.

Suitable ice cutting saws 23 are adjustably mounted upon the shaft 14, and I prefer to mount said saws by providing flanged hubs 24 formed separately from the saws, one of said hubs being arranged upon each side of each saw, the flanges bearing against the saws and being bolted together through the saws. To allow for adjustment of the saws along the shaft 14 thereby regulating the distance between the saws the shaft 14 is grooved as shown at 14$^a$ and the saws are locked in adjusted position and also to the shaft by means of set screws 25 which work through the hubs 24 and extend into the groove 14$^a$.

To prevent chips of ice being thrown into the gearing and also rearwardly upon the operator each saw is protected by a suitable hood 26 which is provided with a side extension 27 adapted to be bolted to the frame 5 and which hood is provided with a hinged flap 28 which is prevented from swinging toward the saw by a small strip 29 which extends downwardly below the lower edge of the hood 26.

In order to rock the frame 5 upon its bearings on shaft 6 and thereby regulate the depth of the cut of the saw I provide the rear end of the frame 5 with an upright frame 30, the side members of which are curved upon an arc struck from the shaft 6, and the rear faces of said side members have a rack 31 formed or secured upon them. A smaller frame 33 is carried by the frame 1 and is provided upon its sides with strips 34 which engage suitable grooves 32 formed upon the inner faces of the side members of the frame 30, the frame 30 sliding upon frame 33. In order that the operator can determine the exact depth of the cut I place a scale 35 upon the frame 33 and a suitable pointer 35ª upon the frame 30, which mark will travel adjacent the scale 35 as the frame 30 is raised and lowered.

Suitable braces 36 extend substantially horizontally from the handles 3 to the frame 33 and a cross brace 37 extends between the two braces 36 and a brace 38 also extends between the handles 3. A shaft 39 is journaled upon the braces 36 and carries cog wheels 40 which mesh with the rack 31. A beveled gear 41 is fixed on shaft 39 and a shaft 42 is mounted upon the braces 37 and 38 and carries a beveled gear wheel 43 which meshes with the bevel gear 41. Shaft 42 is provided with a suitably operating handle 44 and a pawl shaft 45 also hand operated is mounted upon the braces 37 and 38 and carries a suitable pawl or detent 46 adapted to normally lock the bevel gear 43 against rotation, thereby locking the frame 30 in its adjusted position, preventing the same from jumping in case the saws should strike some obstruction.

A cross piece 47 which connects opposite sides of the frame 1 is supported upon runners 48. These runners are swiveled and pivoted as shown in Fig. 10, a bolt 49 being rotatably mounted in the brace 47, and said bolt is provided with a depending perforated ear 50 which extends into a suitable slot formed in the upper face of the runner, and a bolt 51 passes transversely through the runner and through the ear 50. This permits the runner to have both a horizontal and vertical movement. At their forward ends the runners are connected by a rod 48ª.

Suitable sleeves 52 are journaled respectively in the rear portion of the extension 4, which is provided for this purpose, and in brackets 53 carried by forward portions of the frame 1. Sectional rods 54, hinged at 54ª, are slidably carried by the sleeves 52 and are locked in adjusted position by set screws or other suitable means. The outer hinged end portions carry guide runners 54ᵇ, one of which always runs in the last cut made in the ice, thus properly spacing the saw nearest said cut. The other saw is adjusted so that the distance between the two saws will be the same as the distance between the first mentioned saw and the guide runner. While only one runner is in use as a guide at one time they are provided upon both sides of the machine so that one of these runners will always be upon the side adjacent the last cut. In order to prevent wabbling of the saws suitable guide fingers 55 are mounted upon slotted brackets 56 and have inturned end portions upon opposite sides of the saw blade.

It will be obvious that by means of this construction the frame carrying the saws can be readily swung vertically thus regulating the depth of the cut, and by lateral adjustment of the saws and the guide runners the width of the cut can also be regulated. The advantages of a machine making two cuts at once, and which may be adjusted for various thicknesses of ice can be readily appreciated by those using ice cutting machines.

What I claim is:

In a device of the kind described comprising two frames one of which is pivoted to the other at its front end, an upright frame carried by the pivoted frame, the side members of the said upright frame forming rack bars, an upright guide frame carried by the other frame, the upright frame having the rack bars working over the guide frame, the guide frame having a scale thereon, ice cutting saws carried by the pivoted frame, handles carried by the other frame, and a gearing supported from said handles and adapted to mesh with the rack bars and lift or lower the pivoted frame.

EDGAR WRIGHT.

Witnesses:
SADIE M. EATON,
GEORGE A. JOHNSON.

---

Copies of this patent may be obtained for five cents each, by addressing the "Commissioner of Patents, Washington, D. C."